Jan. 27, 1953     H. S. VAN BUREN, JR     2,626,441
SNAP FASTENER SOCKET ASSEMBLY
Filed Aug. 29, 1949
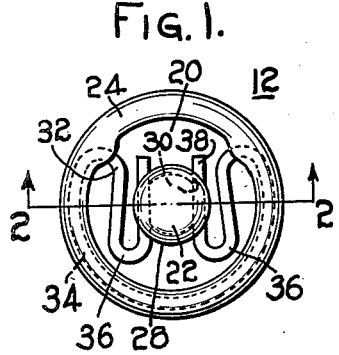
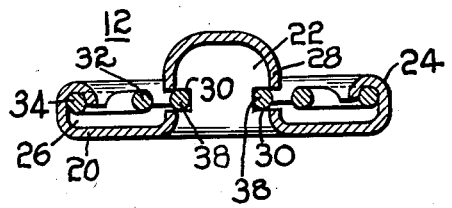
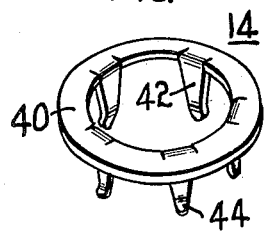
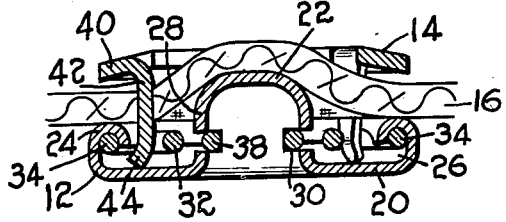
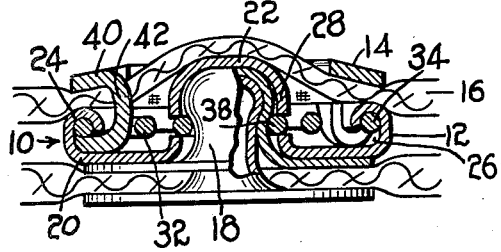
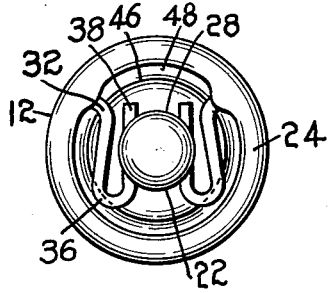
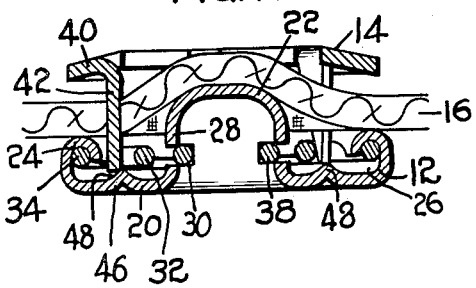
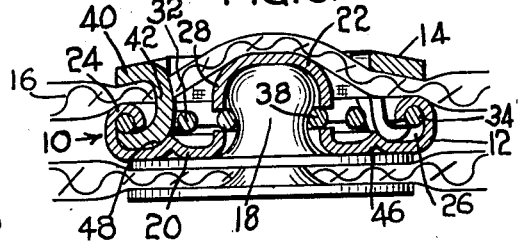
INVENTOR:
HAROLD S. VAN BUREN JR.,
By Walter S. Jones
ATTORNEY.

Patented Jan. 27, 1953

2,626,441

UNITED STATES PATENT OFFICE 2,626,441

SNAP FASTENER SOCKET ASSEMBLY

Harold S. van Buren, Jr., Cambridge, Mass., assignor to United-Carr Fastener Corporation, Cambridge, Mass., a corporation of Massachusetts Application August 29, 1949, Serial No. 112,903

1 Claim. (Cl. 24—218)

This invention relates generally to snap fasteners and has particular reference to a snap fastener socket assembly adapted to be readily attached to a supporting sheet of cloth or the like.

The object of the invention is to provide a snap fastener socket assembly having a multi-looped spring contained socket member and an attaching member for assembly on opposite sides of a supporting sheet in which the attaching member is provided with means for piercing the supporting sheet and engaging the socket member adjacent to the spring.

A further object of the invention is to provide a socket assembly which comprises a multi-looped spring contained socket member and a pronged attaching member which is adapted to be secured to a supporting sheet by forcing the prongs through the sheet and into engagement with a recess on the outer periphery of the socket member without interference from the spring.

A still further object of the invention is to provide a snap fastener socket assembly comprising a socket member having a stud-engaging spring and an attaching member having prongs to pierce a supporting sheet and engage the socket member in which means are provided for turning the prongs outwardly during assembly to force the prongs under a portion of the spring and into a recess on the socket member.

Other objects of the invention will, in part, be obvious and will, in part, appear hereinafter. For a fuller understanding of the nature and objects of the invention, reference should be had to the following detailed description, taken in conjunction with the accompanying drawing, in which:

Fig. 1 is a plan view of a socket member adapted for use in the socket assembly of the invention;

Fig. 2 is a view in section taken on line 2—2 of Fig. 1;

Fig. 3 is a perspective view of a pronged attaching member for use in the socket assembly;

Fig. 4 is a view in elevation, partly in section, of the component parts of the socket assembly during attachment to a supporting sheet;

Fig. 5 is a view in elevation, partly in section, of the component parts of the socket assembled on a supporting sheet and a stud member snapped into engagement therewith;

Fig. 6 is a plan view of a modified form of socket member for use in the socket assembly;

Fig. 7 is a view in elevation, partly in section, of the component parts of the modified form of fastener during attachment to a supporting sheet; and Fig. 8 is a view in elevation, partly in section, of the assembled socket and a stud member snapped into engagement therewith.

Referring to Figs. 1 through 5 of the drawing, there is illustrated a snap fastener socket assembly 10, comprising a socket member 12 and an attaching member 14 which are adapted for assembly on opposite sides of a supporting sheet 16, for snapping engagement with a stud 18.

In the preferred form, the socket member 12 is substantially circular, and comprises a base 20, a stud-receiving portion 22 disposed centrally in the base, and an upwardly and inwardly turned portion 24 about the periphery forming a recess 26. The stud-receiving portion 22 may be conveniently formed by providing an upwardly extending cylindrical portion 28 having a pair of horizontal slots 30 disposed in opposite sides thereof. A spring member 32 is assembled on the base, and comprises a retaining portion 34 disposed in the recess, and a pair of looped portions 36 extending inwardly therefrom, having a pair of stud-engaging legs 38 disposed in the slots 30.

The attaching member 14 comprises an attaching base 40 which may be in the form of a ring as illustrated in Fig. 3, having a series of downwardly extending prongs 42. In one embodiment of the invention, the prongs 42 have pointed ends 44 which are bent outwardly for a purpose to be hereinafter described.

To assemble the component parts of the socket assembly on the supporting sheet, the parts are aligned on opposite sides of the sheet, and forced together so that the prongs 42 pierce the sheet 16 and engage the base 20, with the prongs disposed centrally within the inwardly curled edge 24. (See Fig. 4). As the parts are forced further together, the prong ends 44 are turned outwardly on the base under the retaining portion 34 of the spring and into the recess 26, to retain the parts in assembly on the sheet. (See Fig. 5.) The stud 18 may then be snapped into engagement with the socket in the usual manner, which causes the legs 38 to spring outwardly in the slots 30 and to snap into engagement behind the stud shoulder as illustrated in Fig. 5.

Referring to Figs. 6 through 8, there is illustrated another embodiment of the invention in which the socket assembly has certain modifications within the scope of the invention. In this embodiment, the base 20 of the socket member 12 has an upwardly embossed portion 46, forming an annular inclined camming surface 48 to provide a curling die for the prongs 42. The component parts are attached as hereinbefore described, and in this case the prongs 42 are so disposed on the attaching cap as to contact the inclined camming surface 48 when the parts are forced together, which causes the prongs to curl outwardly under the spring and into the recess. The attaching cap for use with this type of socket member may have prongs with straight ends, since the embossed portion will insure that the prongs curl outwardly in the proper manner. However, it will be understood that attaching caps having prongs with outwardly bent ends as illustrated in Fig. 3 may be used with the socket member of Figs. 6 through 8 with excellent results.

I am aware of fasteners like those shown in Patent No. 2,080,379, and I know that sockets with multi-looped springs have been attached by rivet means or by sewing, but I believe I am the first to attach this type of socket by means of a pronged ring.

Since certain obvious modifications may be made in the device without departing from the scope of the invention, it is intended that all matter contained herein be interpreted in an illustrative and not in a limiting sense.

I claim:

A snap fastener socket, comprising a base having walls forming a recess about the periphery and a centrally disposed upwardly extending tubular stud-receiving portion having a pair of side apertures spaced from the base, said base having an annular upwardly embossed portion disposed thereabout between the recess and the upwardly extending tubular portion forming an outwardly and downwardly inclined annular camming surface, and a spring member assembled with the base, said spring being supported on said upwardly embossed portion above said camming surface and comprising a retaining portion disposed in the recess in spaced relation to the base, looped portions extending over said embossed portions and stud-engaging legs extending from the looped portion and being disposed in said side apertures in spaced relation to the base whereby when suitably spaced prongs of an attaching member are forced into the socket, said prongs are curled outwardly by said inclined camming surface under the retaining portion of the spring and into the recess.

HAROLD S. van BUREN, Jr.

REFERENCES CITED

The following references are of record in the file of this patent:

UNITED STATES PATENTS

| Number | Name | Date |
|---|---|---|
| 1,128,341 | Mann | Feb. 16, 1915 |
| 1,399,319 | Prym | Dec. 6, 1921 |
| 2,286,438 | Reiter | June 16, 1942 |